US012560124B2

(12) United States Patent
Terwilliger et al.

(10) Patent No.: US 12,560,124 B2
(45) Date of Patent: Feb. 24, 2026

(54) CRYOGENIC ASSISTED BOTTOMING CYCLE

(71) Applicant: Raytheon Technologies Corporation, Farmington, CT (US)

(72) Inventors: Neil J. Terwilliger, Cheshire, CT (US); Brandon M. Evans, San Antonio, TX (US)

(73) Assignee: RTX Corporation, Farmington, CT (US)

( * ) Notice: Subject to any disclaimer, the term of this patent is extended or adjusted under 35 U.S.C. 154(b) by 199 days.

(21) Appl. No.: 17/871,270

(22) Filed: Jul. 22, 2022

(65) Prior Publication Data

US 2024/0026824 A1    Jan. 25, 2024

(51) Int. Cl.
*F02C 7/224*        (2006.01)
*F02C 7/141*        (2006.01)
*F02C 7/32*         (2006.01)

(52) U.S. Cl.
CPC .............. *F02C 7/224* (2013.01); *F02C 7/141* (2013.01); *F02C 7/32* (2013.01)

(58) Field of Classification Search
CPC .......... F01K 23/10; F02C 7/224; F02C 7/141; F02C 7/32; F05D 2260/10; F05D 2260/213; F05D 2260/232
See application file for complete search history.

(56) References Cited

U.S. PATENT DOCUMENTS

| | | | | | |
|---|---|---|---|---|---|
| 3,574,477 | A | * | 4/1971 | Dolf | F02K 1/00 |
| | | | | | 415/60 |
| 4,932,204 | A | * | 6/1990 | Pavel | F02C 7/224 |
| | | | | | 60/39.182 |
| 6,499,302 | B1 | * | 12/2002 | Ranasinghe | F01K 23/106 |
| | | | | | 60/39.182 |
| 11,698,210 | B1 | * | 7/2023 | Vaisman | F25B 39/00 |
| | | | | | 62/160 |

(Continued)

OTHER PUBLICATIONS

European Search Report for EP Application No. 23187305.0 dated Dec. 12, 2023.

(Continued)

*Primary Examiner* — Devon C Kramer
*Assistant Examiner* — Henry Ng
(74) *Attorney, Agent, or Firm* — Carlson, Gaskey & Olds, P.C.

(57)        ABSTRACT

A system includes a top cycle and a bottoming cycle. The top cycle is an engine having a combustor. The combustor receives a fuel. The combustor is capable of igniting a mix of fuel and a gas, and creating products of combustion. Products of the combustion pass downstream through a first heat exchanger. The bottoming cycle has a bottoming cycle working fluid receiving a first amount of heat through the first heat exchanger. The bottoming cycle produces work from the first amount of heat. The bottoming cycle working fluid then passes through a second heat exchanger and rejects a second lesser amount of heat. A source housing fuel is delivered to the combustor via the second heat exchanger.

(Continued)

The bottoming cycle working fluid provides heat to the fuel being delivered to the combustor. The source is configured to maintain the fuel at a temperature equal to or below 0° F.

11 Claims, 4 Drawing Sheets

(56)                    References Cited

U.S. PATENT DOCUMENTS

| | | | |
|---|---|---|---|
| 2010/0154781 A1* | 6/2010 | Zhang | F02C 6/18 |
| | | | 126/714 |
| 2010/0242489 A1* | 9/2010 | Saha | F02C 6/18 |
| | | | 60/773 |
| 2012/0110976 A1 | 5/2012 | Paul | |
| 2013/0000272 A1* | 1/2013 | Gulen | F02C 7/224 |
| | | | 60/39.182 |
| 2014/0165572 A1* | 6/2014 | Pang | F01K 3/12 |
| | | | 60/736 |
| 2014/0318134 A1* | 10/2014 | Popovic | F02C 3/22 |
| | | | 60/734 |
| 2015/0096300 A1* | 4/2015 | Gurin | F01K 23/04 |
| | | | 60/668 |
| 2015/0192037 A1* | 7/2015 | Sharp | F01K 9/003 |
| | | | 60/39.182 |
| 2015/0300261 A1* | 10/2015 | Kim | F01K 23/101 |
| | | | 60/692 |
| 2017/0167307 A1* | 6/2017 | Scipio | F02C 6/18 |
| 2018/0119618 A1* | 5/2018 | Erickson | F02C 7/224 |
| 2018/0223696 A1* | 8/2018 | Fujita | F02C 7/224 |
| 2019/0063327 A1* | 2/2019 | Sekiguchi | F02C 7/26 |
| 2020/0224588 A1* | 7/2020 | Somanath | F02C 6/02 |
| 2021/0207544 A1* | 7/2021 | Muldoon | F01D 15/10 |
| 2021/0301720 A1 | 9/2021 | Staubach et al. | |
| 2021/0340908 A1 | 11/2021 | Boucher et al. | |
| 2021/0348561 A1 | 11/2021 | Cocks et al. | |
| 2023/0212983 A1* | 7/2023 | Sibilli | F02C 3/20 |
| | | | 60/730 |

OTHER PUBLICATIONS

European Search Report for EP Application No. 25198111.4 dated Dec. 18, 2025.

* cited by examiner

CRYOGENIC ASSISTED BOTTOMING CYCLE

BACKGROUND OF THE INVENTION

This application relates to a gas turbine engine with a bottoming cycle that has improved efficiency.

Gas turbine engines are known, and typically include a supply of air being delivered into a compressor. The air is compressed and then delivered into a combustor where it is mixed with a fuel and ignited. Products of this combustion pass downstream over a turbine rotor, driving it to rotate. The turbine rotor in turn rotates the compressor.

So-called "bottoming cycles" are known, and utilize the heat downstream of the turbine to drive a supplemental cycle. The cycle provides additional power for various applications associated with the gas turbine engine, or associated with other systems, such as aircraft systems.

In a bottoming cycle, a heat exchanger is positioned downstream of the turbine. The heat exchanger heats a working fluid associated with the bottoming cycle. The working fluid may be downstream of a bottoming compressor, and passing toward a bottoming turbine rotor. Thus, the working fluid approaching the turbine has a greater heat load, and provides additional power to the overall system.

Other types of engines besides gas turbine engines utilize bottoming cycles.

It is further known to have a secondary bottoming cycle heat exchanger capturing the heat downstream of the bottoming cycle turbine. Since the temperature of the working fluid downstream of the bottoming cycle turbine may be relatively low, an ambient working fluid typically may not have a large temperature difference. Thus, the bottoming cycle secondary heat exchangers have typically been relatively large, or have not effectively captured the remaining heat.

SUMMARY OF THE INVENTION

In a featured embodiment, a system includes a top cycle and a bottoming cycle. The top cycle is an engine having a combustor. The combustor receives a fuel. The combustor is capable of igniting a mix of fuel and a gas, and creating products of combustion. The products of the combustion pass downstream through a first heat exchanger. The bottoming cycle has a bottoming cycle working fluid receiving a first amount of heat through the first heat exchanger. The bottoming cycle produces work from the first amount of heat. The bottoming cycle working fluid then passes through a second heat exchanger and rejects a second lesser amount of heat. A source housing fuel is delivered to the combustor via the second heat exchanger. The bottoming cycle working fluid provides heat to the fuel being delivered to the combustor. The source is configured to maintain the fuel at a temperature equal to or below 0° F.

In another embodiment according to the previous embodiment, the temperature of the fuel is below −100° F.

In another embodiment according to any of the previous embodiments, the fuel is a liquid fuel.

In another embodiment according to any of the previous embodiments, the fuel is one of liquid hydrogen, liquid oxygen, or liquid natural gas.

In another embodiment according to any of the previous embodiments, a third heat exchanger is positioned to exchange heat between the products of combustion downstream of the first heat exchanger, and the fuel downstream of the second heat exchanger.

In another embodiment according to any of the previous embodiments, a top shaft is configured to drive a generator.

In another embodiment according to any of the previous embodiments, the bottoming cycle includes a bottom shaft configured to drive a generator.

In another embodiment according to any of the previous embodiments, a motor is positioned downstream of the first heat exchanger, and powers an exhaust compressor which receives the products of combustion downstream of the first heat exchanger. The exhaust compressor is upstream of an exhaust nozzle. The electric motor is provided with a control that controls the speed of the electric motor dependent on conditions of the gas turbine engine.

In another embodiment according to any of the previous embodiments, the second heat exchanger also receives a second bottoming fluid for removing heat from the first bottoming cycle working fluid. A first stage valve controls the flow of the second bottoming fluid to the second heat exchanger. A control controls operation of the first stage valve such that the second bottoming fluid flow is increased when the heat reduction capacity of the source of fuel at the second heat exchanger is less than desirable to cool the first bottoming cycle working fluid.

In another embodiment according to any of the previous embodiments, the bottoming cycle work is used, at least in part, for driving a fan which is included in said top cycle to deliver air into the top compressor.

In another featured embodiment, a gas turbine engine includes a top cycle and a bottoming cycle. The top cycle includes a top compressor having an associated shaft. A top turbine drives the associated shaft to in turn drive the top compressor. A combustor is positioned intermediate the top compressor and the top turbine. The combustor receives compressed air from the top compressor and receives a fuel. The combustor is capable of igniting a mix of the fuel and the compressed air, and passing products of this combustion downstream over the top turbine to drive the top turbine and the associated shaft. Products of the combustion pass downstream of the top turbine through a first heat exchanger, and then to an exhaust nozzle. The bottoming cycle has a bottoming compressor and a bottoming turbine. The first heat exchanger exchanges heat between the products of combustion downstream of the top turbine and a fluid line with a bottoming cycle working fluid. The first heat exchanger receives the bottoming working fluid downstream of the bottoming compressor and upstream of the bottoming turbine such that the products of combustion heat the bottoming cycle working fluid. Downstream of the bottoming turbine the bottoming cycle working fluid passes through a second heat exchanger, and then returns to the bottoming compressor. A bottoming shaft is driven by the bottoming turbine to drive the bottom compressor, and power from rotation of the bottoming shaft being captured for further use. A source housing fuel is delivered to the combustor via the second heat exchanger, such that the bottoming cycle working fluid provides heat to the fuel being delivered to the combustor. The source is configured to maintain the fuel at a temperature equal to or below 0° F.

In another embodiment according to any of the previous embodiments, the temperature of the fuel is below −100° F.

In another embodiment according to any of the previous embodiments, the fuel is a liquid fuel.

In another embodiment according to any of the previous embodiments, the fuel is one of liquid hydrogen, liquid oxygen, or liquid natural gas.

In another embodiment according to any of the previous embodiments, a third heat exchanger is positioned to exchange heat between the products of combustion downstream of the first heat exchanger, and the fuel downstream of the second heat exchanger.

In another embodiment according to any of the previous embodiments, the top shaft is configured to drive a generator.

In another embodiment according to any of the previous embodiments, the bottoming shaft is configured to drive a generator.

In another embodiment according to any of the previous embodiments, a motor is positioned downstream of the first heat exchanger, and is configured to power an exhaust compressor which receives the products of combustion downstream of the first heat exchanger. The exhaust compressor is upstream of an exhaust nozzle. The electric motor is provided with a control that controls the speed of the electric motor dependent on conditions of the gas turbine engine.

In another embodiment according to any of the previous embodiments, the second heat exchanger is further configured to receive a second bottoming fluid for removing heat from the first bottoming cycle working fluid. A first stage valve controls the flow of the second bottoming fluid to the second heat exchanger. A control controls operation of the first stage valve such that the second bottoming fluid flow is increased when the heat reduction capacity of the source of fuel at the second heat exchanger is less than desirable to cool the first bottoming cycle working fluid.

In another embodiment according to any of the previous embodiments, the further use of the captured power includes at least driving a fan which is included in said top cycle to deliver air into the top compressor.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1A:
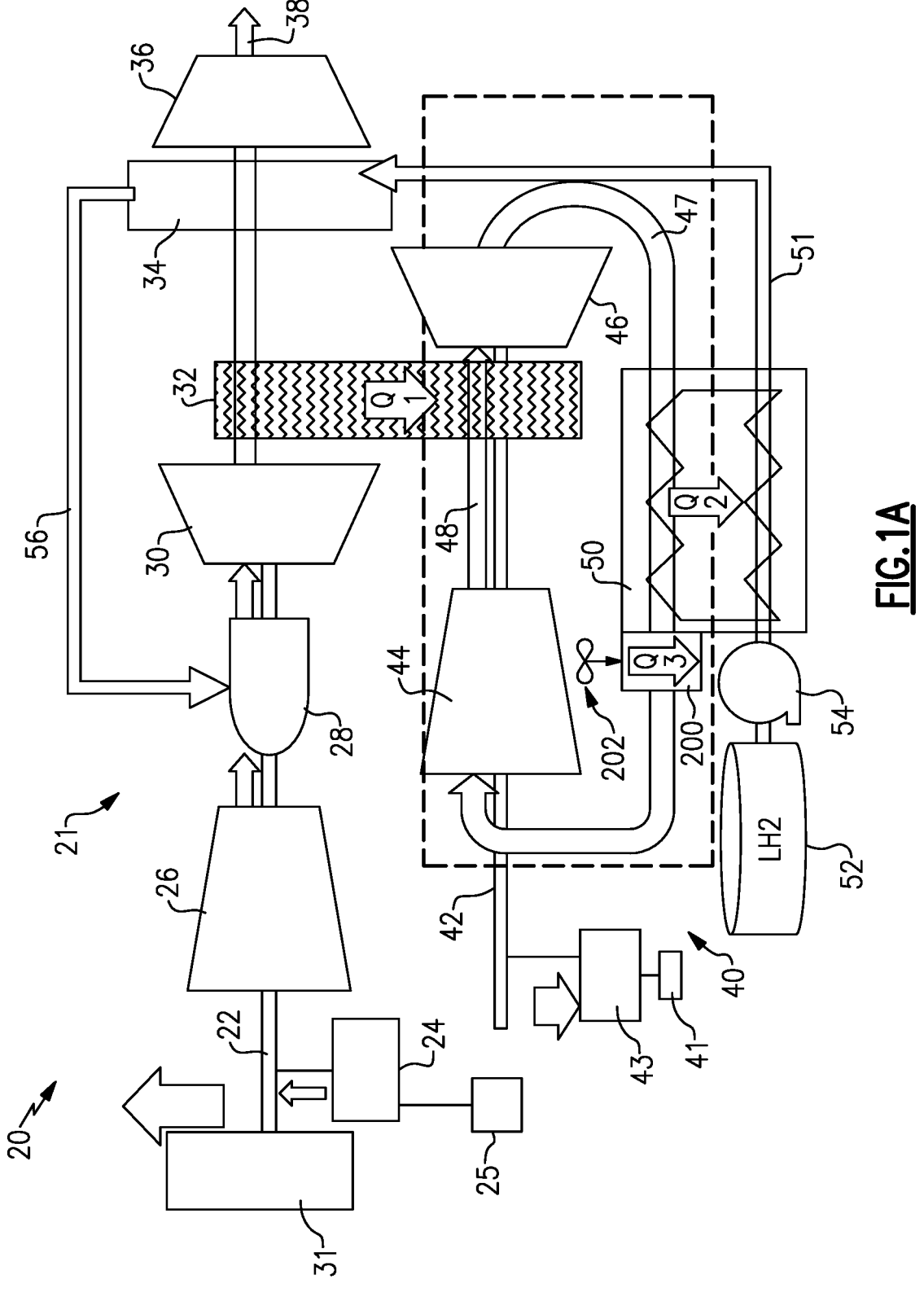
FIG. 1A shows a gas turbine engine according to a first embodiment.

A gas turbine engine 20 is illustrated in FIG. 1A. A base gas turbine engine could be called a top cycle 21. The top cycle 21 includes a shaft 22 which may be associated with a motor or generator 24. The motor 24 may provide boost energy to the shaft 22, while the generator 24 may capture rotational power of the shaft 20, and utilize that power for any number of applications 25. A top compressor 26 receives air, and compresses the air, and delivers it into a combustor 28. The air is mixed with a fuel from line 56, and ignited. Products of this combustion pass downstream over a top turbine rotor 30, driving the rotor 30 to rotate. The rotor 30 in turn drives the compressor 26.

It is known that in practice the top cycle 21 may include a number of other components. As an example, there may be a low pressure compressor and a high pressure compressor, and a high pressure turbine and a low pressure turbine associated with the compressor 26 and turbine 30.

In addition, a fan shown schematically at 31 may deliver the air into the compressor 26. The gas turbine engine 20 may be associated with an aircraft if a fan 31 is utilized. On the other hand, the fan 31 need not be utilized if a gas turbine engine 20 is associated with a land based power generator system.

Downstream of the turbine 30 the products of combustion pass through a heat exchanger 32 in this embodiment. The heat exchanger 32 is associated with a so-called bottoming cycle 40. As shown, an amount of heat kept the Q1 is found in the products of combustion that reach the heat exchanger 32. This heat passes to a bottoming cycle working fluid as described below. The bottoming cycle 40 includes a shaft 42 which may drive a generator 43 such that rotational power of the shaft 42 may be captured and utilized for applications 41.

In the illustrated embodiment, the bottoming cycle 40 is a Brayton cycle. However, other bottoming cycles such as a Rankine, an ORC, a supercritical $CO_2$ cycle, or any number of other refrigerant cycles may be utilized.

The bottoming cycle 40 has a bottoming compressor 44 and an associated bottoming turbine 46. A bottoming cycle refrigerant, or working fluid, downstream of the bottoming compressor 44 passes through the main heat exchanger 32. The working fluid in line 48, downstream of the compressor 44 is heated by the products of combustion (Q1) in the heat exchanger 32. Thus, when the working fluid 48 reaches the bottoming turbine 46 it has increased energy, and provides additional work.

The working fluid downstream of the bottoming turbine 46 passes into a line 47, and then through a second heat exchanger 50. The second heat exchanger 50 interacts with a fluid in a line 51 which is received by a tank 52 (e.g., fuel source). As shown, there is an amount of heat Q2 in the bottoming working fluid downstream of the turbine 46 at the heat exchanger 50 which passes to heat fuel 51. The fluid may be fuel for the top cycle 21. A pump 54 may drive the fuel from the tank 52 through the heat exchanger 50.

Downstream of the heat exchanger 50 the fuel may pass through a supplemental heat exchanger 34 where it is also heated by the products of combustion downstream of the heat exchanger 32. That heated fuel then passes into a line 56 where it is delivered into the combustor 28.

Products of combustion downstream of the heat exchanger pass into a nozzle 36. The products of combustion then exit at 38.

While a particular bottoming cycle is disclosed, other types of bottoming cycles may benefit from this disclosure. As an example, the bottoming cycle need not have a compressor or turbine, but may instead have some other way of producing work from the captured heat.

In embodiments of this disclosure, the fuel in the tank 52 is preferably a cryogenic fuel, but may include any fuel or oxidizer that is stored below ambient temperature. As an example, liquid hydrogen, liquid oxygen or liquid natural gas may be utilized. Such fuel examples typically have a temperature between about −412° F. and 0° F. In embodiments, the fuel has a temperature below 0° F. and in further embodiments the fuel has a temperature below −100° F. More generally, the fuel has a temperature less than about −150° F. As a lower end, the fuel may have a temperature greater than about −435° F.

By utilizing such cold fuel, the heat differential between the working fluid in line 47, which heats the fuel in line 51 is greater. Thus, the heat exchanger 50 may be much smaller than in the prior art. Moreover, the combined top and bottoming cycle efficiency is improved beyond the prior art by recapturing the heat rejected from the heat exchanger 50.

A further feature is shown at a heat exchange portion 200 that receives the bottoming cycle working fluid downstream of the heat exchanger 50. A fan 202, or other fluid moving component, passes a secondary fluid across the heat exchanger portion 200 to remove additional heat Q3 that may remain in the bottoming cycle working fluid downstream of the heat exchanger 50. The fan 202 may be selectively operated such as to be used when the volume, or quality, of the fuel in line 51 is insufficient to remove all of the heat Q2, and further cooling would be desirable before the bottoming cycle working fluid reaches bottom compressor 44.

FIG. 1A shows the top cycle as a gas turbine engine. However, other engine types may benefit from a bottoming cycle as disclosed above.

Figure 1B:
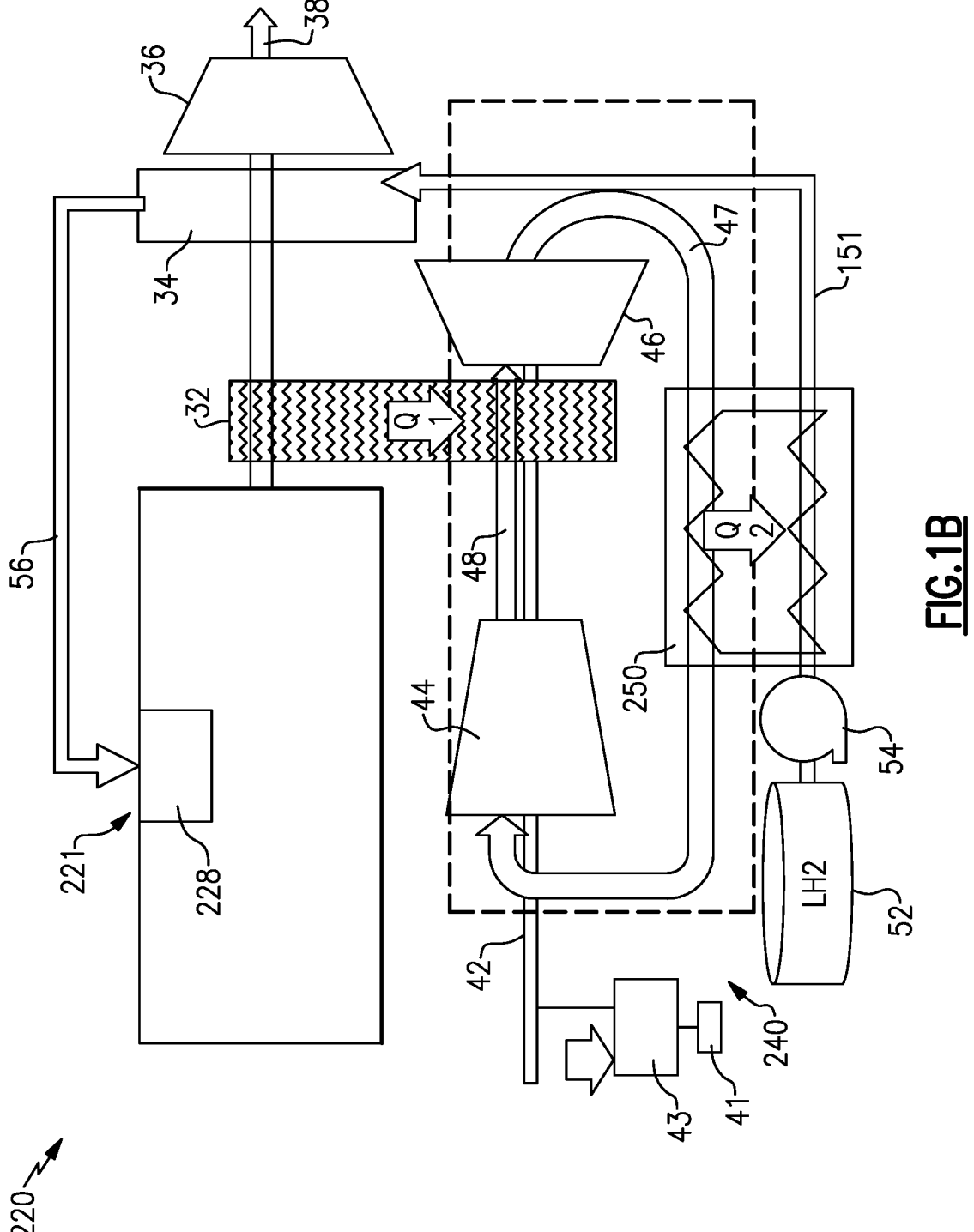
FIG. 1B shows another embodiment of an engine with a bottoming cycle.

For example, FIG. 1B shows an engine embodiment 220 where top cycle 221 is an engine type other than a gas turbine engine. As one example, it may be a hydrogen otto cycle engine.

Any engine type that produces hot products of combustion may be used with bottoming cycle 240. Again, the fuel entering the heat exchanger 250, and heading for combustor 228, is cold similar to the above embodiment described with respect to FIG. 1A.

Figure 2:
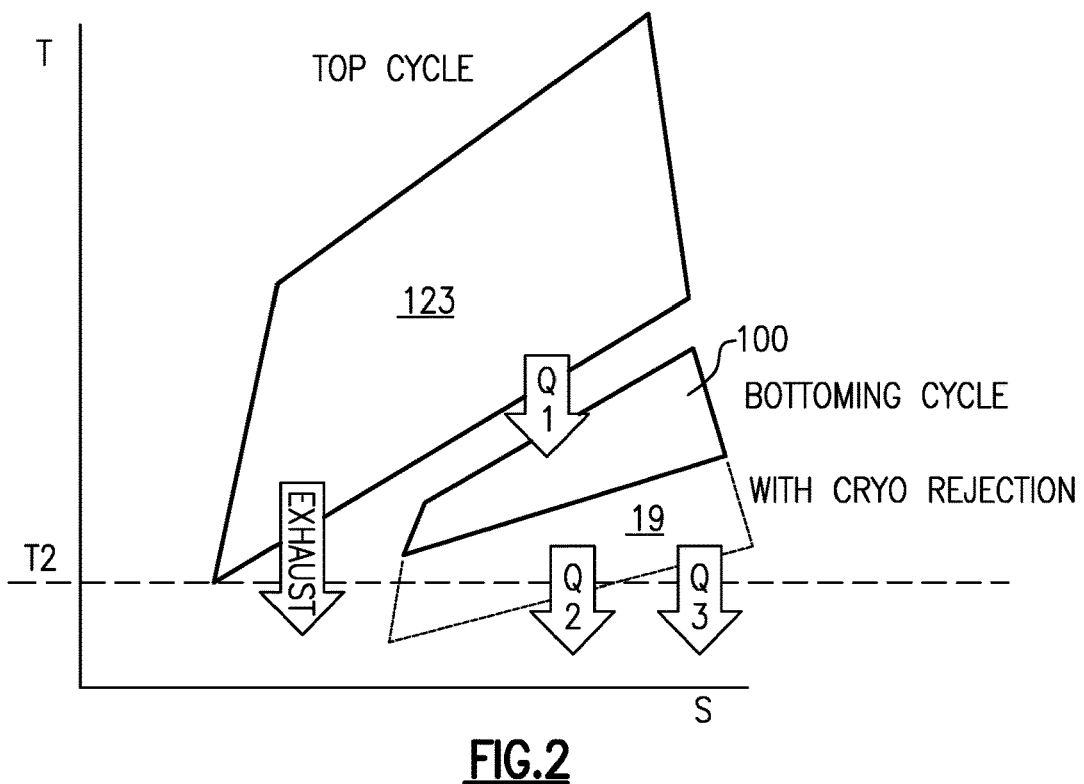
FIG. 2 shows a chart depicting additional work which is captured by the FIG. 1 embodiment.

As illustrated schematically in FIG. 2, the top cycle provides work 123, whereas a typical bottoming cycle 100 provided a first quantity of work, with the cryogenic fuel recaptured providing additional work in the bottoming cycle as shown at 19.

Figure 3:
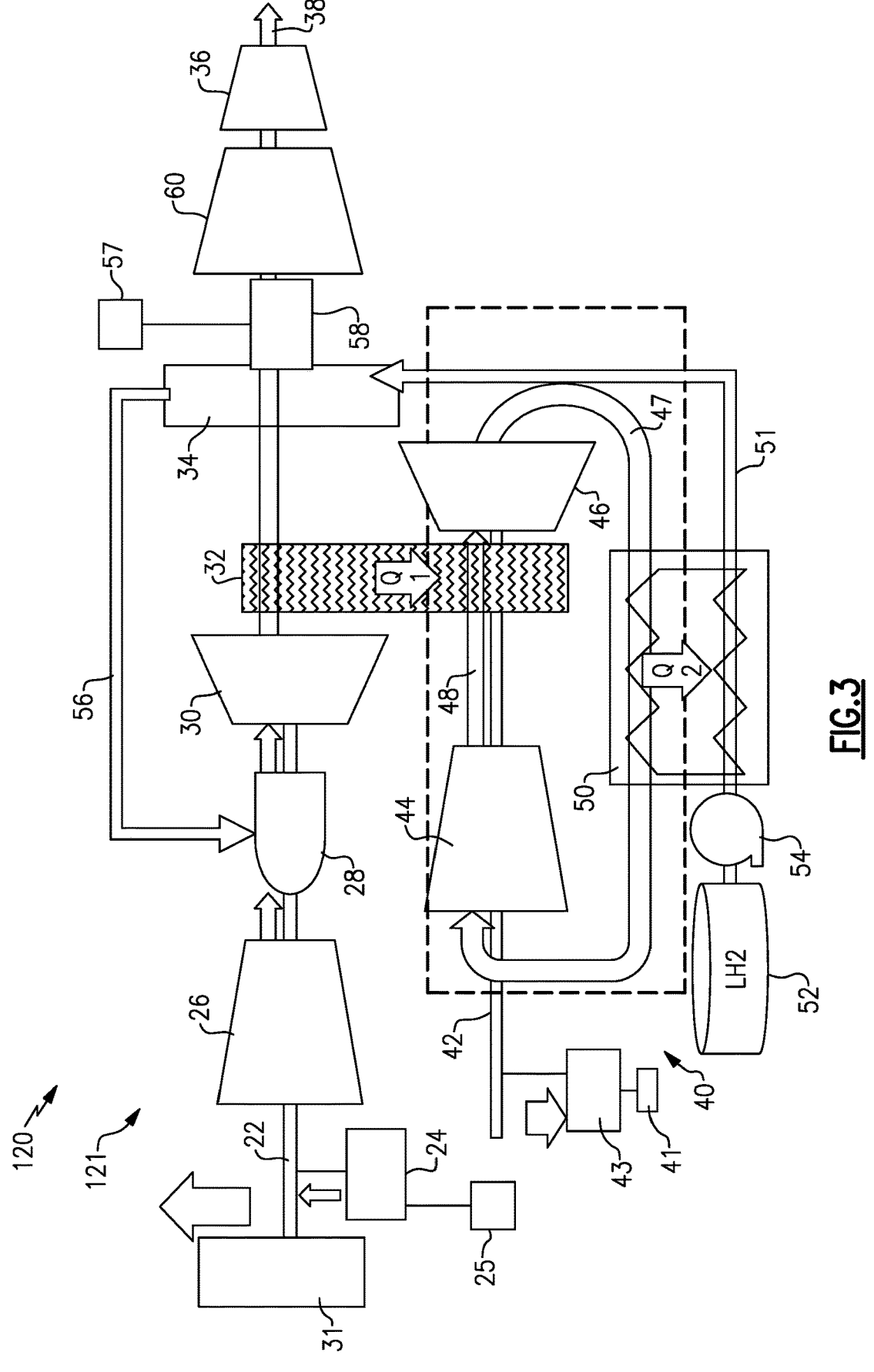
FIG. 3 shows another embodiment gas turbine engine with an additional control feature.

FIG. 3 shows another embodiment 120 having a top cycle 121 which is somewhat distinct from the FIG. 1 top cycle 21. Here the system is generally as in the FIG. 1 embodiment other than the presence of a motor 58 (e.g., an electric motor) controlled by a controller 57. The motor 58 drives an exhaust compressor 60, and a nozzle 36 is downstream of the exhaust compressor 60 such that an exhaust 38 of the engine leaves the nozzle 36.

The exhaust compressor 60 compresses products of combustion downstream of the heat exchanger 34. The use of the compressor 60 can increase the amount of work provided by the top cycle 121 relative to the amount of work provided by the bottoming cycle 40.

The speed of the motor 58, and thus the amount of compression by the compressor 60 is controlled by control 57 based upon the operation of the top cycle 121 or key parameters in the bottoming cycle such as a target temperature entering the bottoming cycle turbine. Applicant has recognized that the amount of fuel delivered into line 51 is dependent upon the operation of the top cycle 121, and thus the capacity for heat rejection to the fuel in line 51 at heat exchanger 50 is limited by the amount of flowing fuel. In high fuel flow situations, there may be sufficient fuel in line 51 to efficiently capture the bulk of the heat available in the heat exchanger 50.

On the other hand, at low fuel operation, such as idle condition of an associated engine, there will be relatively less fuel. Under such condition, the control 57 may operate the motor 58 to increase the work provided by exhaust compressor 60, which will in turn increase the efficiency of the top cycle 121 and require less heat rejection into the fuel through heat exchanger 50.

Control 57 may be a main control for the entire system 120, or may be a stand alone control.

The motor 58 can be utilized to draw down the pressure downstream of the turbine 30 such as at takeoff to reduce the Q2 temperature at the heat exchanger 50.

This optimizes the efficiency of the combined cycle at multiple operating points by controlling the compressor pressure ratio. Also, it ensures excess waste heat is sent to the top cycle exhaust instead of overheating the bottoming cycle. When the exhaust compressor receives more power, less heat is sent to the bottoming cycle. The bottoming cycle is a smaller portion of the total power, and less heat needs to be rejected to the fuel because more of it went out of the top cycle exhaust.

Such a system including the motor 58 and/or exhaust compressor 60 may be utilized with the FIG. 1B type system.

Figure 4:
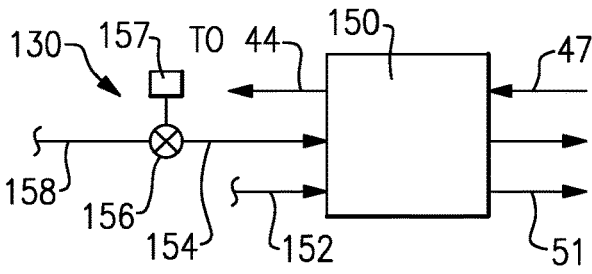
FIG. 4 shows another embodiment heat exchanger.

An optional feature 130 is illustrated in FIG. 4, and can be incorporated into the systems of either FIG. 1A, or FIG. 1B or FIG. 3. The heat exchanger 50 from FIG. 1A, FIG. 1B and FIG. 3 may be replaced by a two stage heat exchanger 150. The first bottoming fluid 47 passes through the heat exchanger 150 as in the prior embodiments. Fuel at 152 also passes through the heat exchanger 150 and cools the bottoming fluid heading to compressor 44. However, at times, there may be inadequate fuel cooling capacity to adequately cool the bottoming fluid in line 47 prior to it reaching the compressor 44. As such, a second bottoming fluid is selectively passed through the heat exchanger 150. In particular, a source of fluid 158 passes through a valve 156 to a line 154 that passes across the heat exchanger 150. Fluid 158 may be air. A control 157 controls the valve.

If there is inadequate cooling capacity from the fuel flow alone, then the control 157 opens valve 156 to supply supplemental cooling fluid through the heat exchanger 150. This allows the system to maintain the heat in line 47 downstream of heat exchanger 150 within acceptable limits.

Figure 5:
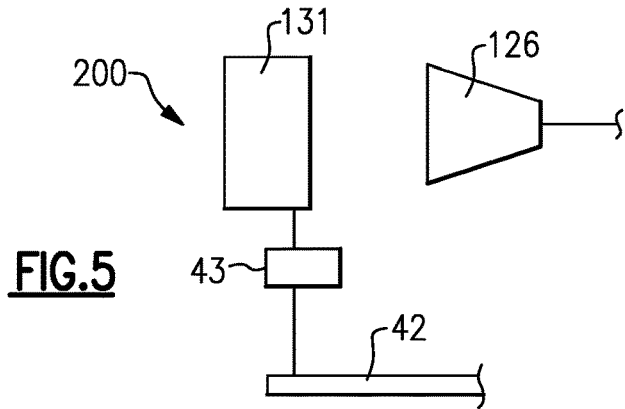
FIG. 5 shows with an alternate fan drive.

FIG. 5 shows yet another embodiment engine 200. In embodiment 200, the generator 43 driven by rotation of shaft 42 is utilized to power a fan 131. In this embodiment 200, the compressor 126 is separately powered by the turbine as in the earlier embodiments. However, some of the power generated at generator 43 may be used to power the fan 131.

While the top cycles are shown somewhat schematically, it should be understood there could be more than one gas turbine engine spool in the top cycle. As an example, there could be another turbine driving a fan. Moreover, a typical two-spool engine could be utilized.

A system under this disclosure could be said to include a top cycle and a bottoming cycle. The top cycle is an engine having a combustor. The combustor receives a fuel. The combustor is capable of igniting a mix of fuel and a gas, and creating products of combustion. The products of the combustion pass downstream through a first heat exchanger. The bottoming cycle has a bottoming cycle working fluid receiving a first amount of heat through the first heat exchanger. The bottoming cycle produces work from the first amount of heat. The bottoming cycle working fluid then passes through a second heat exchanger and rejects a second lesser amount of heat. A source housing fuel to be delivered to the combustor via the second heat exchanger, such that the bottoming cycle working fluid provides heat to the fuel being delivered to the combustor. The source is configured to maintain fuel at a temperature equal to or below 0° F.

A gas turbine engine under this disclosure could be said to include a top cycle and a bottoming cycle. The top cycle includes a top compressor having an associated shaft. A top turbine drives the associated shaft to in turn drive the compressor. A combustor is positioned intermediate the top compressor and the top turbine. The combustor receives compressed air from the top compressor and receives a fuel. The combustor is capable of igniting a mixed fuel and air, and passes products of this combustion downstream over the top turbine to drive the top turbine and the associated shaft. Products of the combustion pass downstream of the top turbine through a first heat exchanger, and then to an exhaust nozzle. The bottoming cycle has a bottoming compressor and a bottoming turbine. The first heat exchanger exchanges heat between the products of combustion downstream of the top turbine and a fluid line with a bottoming cycle working fluid. The first heat exchanger receives the bottoming working fluid downstream of the bottoming compressor and upstream of the bottoming turbine such that the products of combustion heat the bottoming cycle working fluid. Downstream of the bottoming turbine the bottoming cycle working fluid passes through a second heat exchanger, and then returns to the bottoming compressor. A bottoming shaft is driven by the bottoming turbine to drive the bottom compressor, and power from rotation of the bottoming shaft is captured for further use. A source housing fuel to be delivered to the combustor via the second heat exchanger, such that the bottoming cycle working fluid provides heat to the fuel being delivered to the combustor. The source is configured to maintain the fuel at a temperature equal to or below 0° F.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A system comprising:

a top cycle and a bottoming cycle;

said top cycle being an engine having a combustor, the combustor receiving a fuel, the combustor being capable of igniting a mix of the fuel and a gas, and creating products of combustion, the products of combustion passing downstream through a first heat exchanger;

the bottoming cycle having a bottoming cycle working fluid receiving a first amount of heat through the first heat exchanger, the bottoming cycle producing work from the first amount of heat, and the bottoming cycle working fluid then passing through a second heat exchanger and rejecting a second lesser amount of heat;

a source housing the fuel to be delivered to the combustor via the second heat exchanger, such that the bottoming cycle working fluid provides heat to the fuel being delivered to the combustor;

wherein the source is configured to maintain the fuel at a temperature equal to or below 0° F.; and wherein an electric motor is positioned downstream of the first heat exchanger, and powers an exhaust compressor which receives the products of combustion downstream of the first heat exchanger, and said exhaust compressor being upstream of an exhaust nozzle, said electric motor being provided with a control that controls the speed of the electric motor dependent on the amount of the fuel being delivered to the combustor.

2. The system as set forth in claim 1, wherein a third heat exchanger is positioned to exchange heat between the products of combustion downstream of the first heat exchanger, and the fuel downstream of the second heat exchanger, with the products of combustion passing through the third heat exchanger.

3. The system as set forth in claim 1, wherein the bottoming cycle working fluid returns downstream of the second heat exchanger passing through a bottoming cycle compressor.

4. A gas turbine engine comprising:

a top cycle and a bottoming cycle;

said top cycle including a top compressor having an associated shaft, and a top turbine driving the associated shaft to in turn drive the top compressor, a combustor positioned intermediate the top compressor and the top turbine, and the combustor receiving compressed air from the top compressor and receiving a fuel, the combustor being capable of igniting a mix of the fuel and the compressed air, and passing products of combustion downstream over the top turbine to drive the top turbine and the associated shaft, the products of combustion passing downstream of the top turbine through a first heat exchanger, and then to an exhaust nozzle;

the bottoming cycle having a bottoming compressor and a bottoming turbine, the first heat exchanger exchanging heat between the products of combustion downstream of the top turbine and a fluid line with a bottoming cycle working fluid, the first heat exchanger receiving the bottoming cycle working fluid downstream of the bottoming compressor and upstream of the bottoming turbine such that the products of combustion heat the bottoming cycle working fluid, downstream of the bottoming turbine the bottoming cycle working fluid passing through a second heat exchanger, and then returning to the bottoming compressor, a bottoming shaft being driven by the bottoming turbine to drive the bottoming compressor, and power from rotation of the bottoming shaft being captured for further use;

a source housing the fuel to be delivered to the combustor via the second heat exchanger, such that the bottoming cycle working fluid provides heat to the fuel being delivered to the combustor;

wherein the source is configured to maintain the fuel at a temperature equal to or below 0° F.;

wherein a third heat exchanger is positioned to exchange heat between the products of combustion downstream of the first heat exchanger, and the fuel downstream of the second heat exchanger, with the products of combustion passing through the third heat exchanger; and wherein an electric motor is positioned downstream of the third heat exchanger, and is configured to power an exhaust compressor which receives the products of combustion downstream of the third heat exchanger, and said exhaust compressor being upstream of the exhaust nozzle, said electric motor being provided with a control that controls the speed of the electric motor dependent on conditions of the gas turbine engine.

5. The gas turbine engine as set forth in claim 4, wherein the temperature of the fuel is below −100° F.

6. The gas turbine engine as set forth in claim 5, wherein the fuel is a liquid fuel.

7. The gas turbine engine as set forth in claim 6, wherein the fuel is one of liquid hydrogen, liquid oxygen, or liquid natural gas.

8. The gas turbine engine as set forth in claim 4, wherein the associated shaft is configured to drive a generator.

9. The gas turbine engine as set forth in claim 4, wherein the bottoming shaft is configured to drive a generator.

10. The gas turbine engine as set forth in claim 4, wherein the second heat exchanger is further configured to receive a second bottoming fluid for removing heat from the bottoming cycle working fluid, a first stage valve controlling the flow of the second bottoming fluid to the second heat exchanger, and the control controlling operation of the first stage valve such that the second bottoming fluid flow is increased when the heat reduction capacity of the source of the fuel at the second heat exchanger is less than desirable to cool the bottoming cycle working fluid.

11. The gas turbine engine as set forth in claim 4, wherein the further use of the captured power includes at least driving a fan which is included in said top cycle to deliver air into the top compressor.

* * * * *